(12) United States Patent
Sauber

(10) Patent No.: US 7,764,627 B2
(45) Date of Patent: Jul. 27, 2010

(54) INTERCONNECT CIRCUIT, SYSTEM, AND METHOD FOR PROVIDING OPERATING MODES FOR COMMUNICATION CHANNELS

(75) Inventor: William F. Sauber, Georgetown, TX (US)

(73) Assignee: Dell Products, LP, Round Rock, TX (US)

( * ) Notice: Subject to any disclaimer, the term of this patent is extended or adjusted under 35 U.S.C. 154(b) by 654 days.

(21) Appl. No.: 11/621,799

(22) Filed: Jan. 10, 2007

(65) Prior Publication Data
US 2008/0165694 A1    Jul. 10, 2008

(51) Int. Cl.
H04L 12/28    (2006.01)
(52) U.S. Cl. ....................... 370/254; 370/252
(58) Field of Classification Search ............. None
See application file for complete search history.

(56) References Cited

U.S. PATENT DOCUMENTS 5,924,022 A * 7/1999 Beasley et al. ............. 455/218
2005/0271064 A1* 12/2005 Chang et al. ............... 370/397
2006/0215545 A1* 9/2006 Nelson ...................... 370/216
2007/0140289 A1* 6/2007 Tellado et al. .............. 370/445

* cited by examiner

Primary Examiner—Chi H Pham
Assistant Examiner—Fan Ng
(74) Attorney, Agent, or Firm—Larson Newman & Abel, LLP

(57) ABSTRACT

An interconnect circuit, system, and method for providing operating modes for communication channels is disclosed. According to one aspect, a method of determining an operating mode for a communication link can include providing an operating parameter within a memory device. The operating parameter can be provided in association with a channel characteristic of a communication channel. The method can further include reading the operating parameter stored within the memory device and communicating the operating parameter to a communication interface. The method can also include comparing the operating parameter to a performance limit of the communication interface and establishing an operating mode of the communication link in response to the comparison.

17 Claims, 3 Drawing Sheets

INTERCONNECT CIRCUIT, SYSTEM, AND METHOD FOR PROVIDING OPERATING MODES FOR COMMUNICATION CHANNELS

FIELD OF THE DISCLOSURE

This disclosure relates generally to information handling systems, and more particularly, to an interconnect circuit, system, and method for establishing operating modes for communication channels.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

Communication between information handling systems and various internal and external components has expanded to include various different types of communication mediums and associated communication protocols. For example, serial and parallel communication buses or links, such as Universal Serial Buses (USB), a Peripheral Component Interconnect (PCI), PCI Express, etc. can be used to connect peripheral devices or components using a specific communication protocol.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
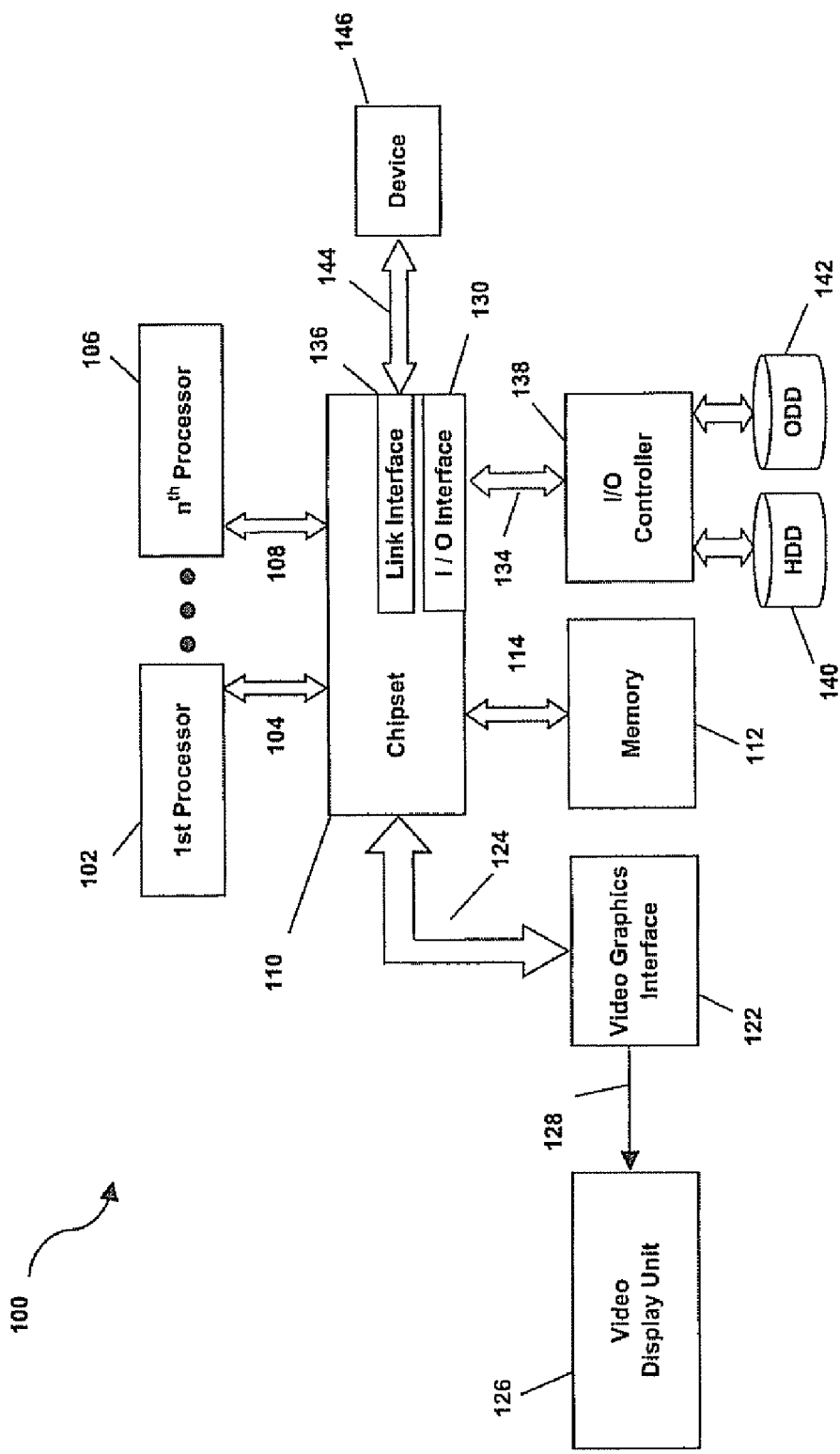
FIG. 1 illustrates a block diagram of an information handling system according to one aspect of the disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As indicated above, the following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. The teachings may also be utilized in other applications and with several different types of architectures such as distributed computing architectures, client/server architectures, or middleware server architectures, and associated components.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and may vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses or links operable to transmit communications between the various hardware components.

A communication interconnect circuit is operably associated with a communication link. The communication interconnect circuit can include a control logic operable to alter an operating mode of a communication link using an operating parameter of the communication channel. The communication interconnect circuit can also include a channel communicator operably coupled to the control logic. The channel communicator can be operable to communicate the operating parameter in association with determining the operating mode of the communication link.

According to a particular aspect, an information handling system can include a communication interface operable to establish a communication link based on an operating parameter of a communication channel. The information handling system can also include a communication apparatus including a memory device storing the operating parameter. In one form, the communication apparatus can be coupled to the communication interface using the communication link. The information handling system can also include a processor operably coupled to the communication interface. The processor can be operable to determine an operating performance level of a communication channel of the communication link using the operating parameter.

According to a further aspect of the disclosure, a method of determining an operating mode of a communication link can include providing an operating parameter within a memory device. The operating parameter can be associated with a channel characteristic of a communication channel. The method can further include reading the operating parameter stored within the memory device and communicating the operating parameter to a communication interface. The method can also include comparing the operating parameter to a performance limit of the communication interface and establishing an operating mode of the communication link in response to comparing the operating parameter to the performance limit.

FIG. 1 illustrates a block diagram of an exemplary embodiment of an information handling system, generally designated at 100. As shown in FIG. 1, the information handling system 100 can include a first physical processor 102 coupled to a first host bus 104 and can further include additional processors generally designated as $n^{th}$ physical processor 106 coupled to a second host bus 108. The first physical processor 102 can be coupled to a chipset 110 via the first host bus 104. Further, the $n^{th}$ physical processor 106 can be coupled to the chipset 110 via the second host bus 108. The chipset 110 can support multiple processors, and can allow for simultaneous processing of multiple processes, and supports the exchange of information within information handling system 100 during multiple processing operations.

According to one aspect, the chipset 110 can be referred to as a memory hub or a memory controller. For example, the chipset 110 the can include a dedicated bus to transfer data between first physical processor 102 and the $n^{th}$ physical processor 106. For example, the chipset 110 including a chipset that can include a memory controller hub and an input/output (I/O) controller hub. As a memory controller hub, the chipset 110 can function to provide access to the first physical processor 102 using the first bus 104 and the nth physical processor 106 using the second host bus 108. The chipset 110 can also provide a memory interface for accessing the memory 112 using a memory bus 114. In a particular embodiment, the buses 104, 108, and 114 can be individual buses or part of the same bus. The chipset 110 can also provide bus control and can handle transfers between the buses 104, 108, and 114.

According to one aspect, the chipset 110 can include an application specific chipset that provides connectivity to various buses, and integrates other system functions. For example, the chipset 110 can be provided using an Intel® Hub Architecture (IHA) chipset also that can include two parts, a Graphics and Memory Controller Hub (GMCH) and an I/O Controller Hub (ICH). For example, an Intel 975X chipset, Intel G965 chipset available from the Intel Corporation of Santa Clara, Calif., or any combination thereof, can be at least a portion of the chipset 110. The chipset 110 can also be packaged as an application specific integrated circuit (ASIC).

In one form, the chipset 110 can be coupled to a video graphics interface 122 using a fourth bus 124. In one form, a video graphics interface 122 can include a PCI Express interface operable to display content within a video display unit 126. The video graphics interface 122 can provide a video display content output 128 to the video display unit 126. The video display unit 126 can include one or more types of video displays such as a flat panel displays (FPDs), Cathode Ray Tube displays (CRTs) or other type of display devices.

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the fourth bus 124 operable as a PCI Express link and communicates with the video graphics interface 122. The Northbridge portion can also communicate with the first physical processor 102 using first bus 104 and the second bus 108 coupled to the $n^{th}$ physical processor 106. The chipset 110 can also include a Southbridge portion (not illustrated) of the chipset 110 and can handle I/O functions of the chipset 110. The Southbridge portion can be coupled to the I/O interface 130 and can manage the basic forms of input/output (I/O) such as Universal Serial Bus (USB) I/O, serial I/O, audio outputs, Integrated Drive Electronics (IDE) I/O, and Industry Standard Architecture (ISA) I/O for the information handling system 100. According to one aspect, the information handling system 100 can include the input/output (I/O) interface 130 operably coupled to the chipset 110 using an I/O bus or link 134. In one form, the I/O interface 130 can include serial buses, parallel buses, links, or any combination thereof, and can be provided as an industry standard bus or proprietary bus.

According to another aspect, the information handling system 100 can also include the I/O bus or link 134 operably coupled to a link interface 136 and an I/O controller 138. The I/O bus or link 134 can be operable to connect one or more devices using a variable-speed communication bus such as a Peripheral Component Interconnect (PCI) Express communication bus. For example, a PCI Express communication bus can be operated at more than one (1) speed (e.g. 2.5 GHz and 5.0 GHz) based on a connected device. PCI buses and PCI-Express buses can be provided to comply with industry standards for connecting and communicating with PCI-enabled hardware devices or components when connected to the information handling system 100. Other industry standard buses or proprietary buses, such as ISA, SCSI, I2C, SPI, or USB buses, or any combination thereof, can also be used in association with, or independent of, the I/O bus or link 134.

In one form, the I/O bus or link 134 can connect to the I/O controller 138 operable to connect one or more disk drives such as a hard disk drive (HDD) 140, an optical disk drive (ODD) 142 such as a Read/Write Compact Disk (R/W-CD), a Read/Write Digital Video Disk (R/W-DVD), a Read/Write mini Digital Video Disk (R/W mini-DVD), or other type of drive. According to another aspect, the I/O bus or link 134 can be coupled to the link interface 136 operable to couple other devices. In one form, one or more devices can be coupled the link interface 136. In one form, the link interface 136, the I/O interface 130, or combination thereof can be provided as a part of the chipset 110 or as a separate component.

According to another aspect, the link interface 136 can allow for connecting multiple devices and can be used to establish communication channels between multiple devices. In one form, the link interface 136 can include multiple card slots operable to receive one or more devices or components. However, in other embodiments, the link interface 136 can allow for connecting one or more devices using the device communication link 144 having a specific communication link length, channel length, and topology. For example, a device 146 can be connected to the link interface 136 using the device communication link 144.

According to one aspect, the device 146 can include a link interface operable to connect the device 146 to the device communication link 144. The device 146 can also include a memory device operable to store one or more operating parameters that can be used to determine an operating mode of the device communication link 144 and a control logic operable to be used for connecting to the link interface 136. In one form, the device 146 can be provided as one component or separate components. For example, the device 146 can include a 10/100/1000BASE-T controller with an integrated transceiver, such as Part Number BCM5751 manufactured by Broadcom Corporation®, a 4-Port/4-Lane, PCI Express Packet Switch Part Number P17C9X20404 manufactured by Pericom Semiconductor, or any combination, logic, or architecture thereof can be used.

According to one aspect, the device 146 can also include channel characteristics of the device communication link 144, and may be accessed by the information handling system 100 to determine an operating mode of the device communication link 144. For example, a channel characteristic can include an overall length of the device communication link 144, a transmitter and de-emphasis setting recommendation, a channel speed recommendation, S-parameters, or other characteristics, or information that may be used to establish an operating mode for the device communication link 144.

In one form, the device 146 can be provided as a PCI Express compliant device or component operable to communicate with the information handling system 100 using a PCI Express communication protocol. For example, a PCI-enabled device can include a device using a PCI specification such as "PCI Local Bus Specification," Version 3.0 dated Feb. 3, 2004 or other PCI specifications as desired. In one form, Chapter 6 of the "PCI Local Bus Specification" includes one example of a specification that can be employed. In one embodiment, the device 146 can include a PCI Express enabled device that can be coupled to the link interface 136 using the device communication link 144 operable as a PCI Express bus. For example, the device 146 can be an Adaptec RAID 1220SA manufactured by Adaptec Inc® can be provided as a PCI Express compliant device with accessible information. According to one aspect, the I/O interface 130 and the link interface 136 can be provided as the same interface and allows for connecting to one or more I/O controllers 138 operable as a redundant array of independent disk (RAID) devices.

During operation, the information handling system 100 can detect the device 146 coupled to the link interface 136 using the device communication link 144. The link interface 136 and the device 146 can provide access to memory of the device 146 to determine an operating mode of the device communication link 144 for establishing a communication channel. In one embodiment, the device 146 and the link interface 136 can negotiate channel settings for establishing a communication channel using the device communication link 144. Negotiating channel settings can include providing a maximum operating condition for the device 146 and determining if the device 146 and the communication link 144 can support the maximum operating condition. In one form, the information handling system 100 can access device identifier or vendor identifier information for the device 146 to determine an operating mode. Communication can be established based on the identifier information. In another form, the device 146 can be coupled to the information handling system 100 and a standard connection can be established between the device 146. A first connection can include connecting the device 146 at a first speed and determining if the first speed can be used to communicate between the device 146 and the link interface 136. If the device 146 can communicate at the first speed, the first speed can be established. If the device 146 cannot communicate at the first speed, a second speed can be established. In one form, the first speed can be less than the second speed, In another form, transmitter and de-emphasis settings can be used to determine a signal level for communicating with the device 146.

In a particular embodiment, upon coupling the device 146 to the link interface 136 using the device communication link 144, the device 146 can provide a list of operating parameters associated with the overall channel length of the device communication link 144 to determine an operating mode of the device communication link 144. The capabilities list can be stored within the memory device of the device 146 and accessed and communicated to the information handling system 100 upon coupling the device 146 to the link interface 136 using the device communication link 144. The capabilities list can be communicated to the link interface 136 and the information handling system 100 or link interface 136 can process the capabilities list to determine an operating mode for establishing a communication channel using the device communication link 144.

In one form, the information handling system 100 can compare one or more endpoint values provided within the capabilities list, to a maximum operating level, to determine a maximum operating mode that can be employed by the link interface 136. For example, a channel speed and transmitter and de-emphasis setting recommendation can be used by the device 146 and the information handling system can compare the recommended settings to a maximum operating level to determine an operating mode. Upon determining an operating mode, the link interface 136 can communicate a determined operating mode to the device 146, and the device 146 can establish a channel speed and transmitter and de-emphasis setting for communicating using the device communication link 144. In this manner, the device 146 can provide a recommended setting to the information handling system 100 and an operating mode can be established based on an operating characteristic of the device communication link 144. As such, channel characteristics specific to a communication link can be communicated to the information handling system 100. An operating mode can be established based on an actual operating environment obviating the need for the information handling system 100 to predict an operating mode.

In one embodiment, the overall channel length of the device communication link 144 may be greater than a channel specification for communicating with the device 146 when coupled to the link interface 136. For example, the device 146 may be coupled to device communication link 144 that may be greater than a specific cable length to operate the communication link 144 at a maximum channel speed. As such, the device 146 can provide a channel speed recommendation setting that is slower than what a specification setting may be for the type of device. In this manner, the device 146 can communicate a channel speed recommendation setting to the information handling system 100, and a slower channel speed can be established based on the channel characteristics of the device communication link 144. As such, greater channel lengths can be employed by the information handling system 100 for devices that can be operated at higher speeds. Additionally, the device 146 can be operated based on demands that may be placed as a function of the overall channel length and operating characteristics of specific communication links connecting the device 146 to the link interface 136.

In another embodiment, a transmitter and de-emphasis setting recommendation can be communicated by the device 146. For example, a transmitter and de-emphasis setting can be stored within a memory of the device 146 and communicated to the information handling system 100. The information handling system can process the transmitter and de-emphasis setting level recommendation. A transmitter and de-emphasis level can be used for communicating with the device 146 using the device communication link 146. For example, the device 146 can receive an input from the link interface 136 to establish an operating mode including a transmitter and de-emphasis level setting. The device 146 can then establish a transmitter and de-emphasis setting level, and the device 146 can communicate with the link interface 136 using the transmitter and de-emphasis setting level. In this manner, a transmitter and de-emphasis setting can be provided by the device 146 based on a channel characteristic of the device communication link 144. According to one aspect, a transmitter and de-emphasis setting can be used by de-emphasis one or more bits within a series of bits to reduce saturation effects. As such, one or more transmitter and de-emphasis settings can be used for establishing communication at one or more channel speeds and a specific channel length used by the device 146.

According to a further aspect, the device 146 can include various types of memory, such as Read Only Memory (ROM) devices, Erasable Programmable Read Only Memory (EPROM) devices, Electrically Erasable Programmable Read Only Memory (EEPROM) devices, Random Access Memory (RAM) devices, Fast Static Random Access Memory (FSRAM) devices, or other types of memory operable to store information that can be used in association with establishing an operating mode for a communication channel provided using the device communication link 144. For example, the device 146 can include an option ROM memory device that can be programmed to store channel characteristics, operating parameters, or recommended settings. Contents of the option ROM memory device can be used in association with determining an operating mode for establishing a communication channel using the device communication link 144. In another form, the device 146 can include an option ROM memory device that can be accessed by a basic input output system (BIOS) of the information handling system 100. The BIOS can access the option ROM memory device during an initialization or a boot sequence to determine an operating mode. A portion or all of the contents of the option ROM memory device can be accessed to establish an operating mode. In one form, a vendor or supplier of the device 146, the device communication link 144, or associated components, can provide information to be stored within the option ROM memory device, and used by the information handling system 100 to determine an operating mode. In this manner, information describing the characteristics of the device communicating link 144, and the device 146, can be communicated to the information handling system 100. During initialization, a maximum performance level or setting for establishing a communication channel using the device communication link 144 can be determined.

In another form, the information handling system 100 can include software or firmware that allows for scanning the link interface 136 to detect devices such as the device 146. For example, the link interface 136 can include multiple integrated circuit card slots, or card slots, operable to couple multiple devices. The information handling system 100 can access each card slot of the link interface 136, and read an identifier to determine what device may be coupled to the link interface 136. Identifiers, such as vendor or manufacturer identifiers, device identifiers, product identifiers, etc. to the information handling system 100 can be used to validate a device connected to the link interface 136. In one form, validating a device can include accessing a specific address or range of addresses within a memory device of a connected device. For example, the device 146 can include a memory device and location that can be accessed to determine information within the memory device 150. In one form, returning a value of all one's (e.g. binary 1's) after an inquiry to a memory location can be an adequate response to a read request upon the information handling system 100 accessing a specific register of the device 146.

In another form, the device 146 can include an EEPROM memory device that can store one or more channel characteristics used in association the device 146. For example, channel characteristics can be stored within a portion of a capabilities list. The capabilities list can be accessed by the information handling system 100 while establishing a connection or initialization. The channel characteristics can be read to determine one or more operating parameters of the device 146 when establishing communication. In one form, the capabilities list can be stored within specific region of memory that may be reserved for storing operating parameters, such as "S-parameters," for the device 146. According to one aspect, "S-parameters" can include data that can be stored within a region of memory for the device 146, and can be communicated to a host system, such as information handling system 100, "S-parameters" can provide unique information that can be used by the information handling system 100. During use of the device 146, "S-parameters" can be accessed and evaluated using a routine provided by the device 146, and used in association with operating the device 146. In one form, "S-parameters" can be stored within a capabilities list, and can provide specific information using one or more data fields of the capabilities list. For example, "S-parameters" can include information to identify an operating characteristic unique to the device 146 and the device communication channel 144. "S-parameters" can be provided by a vendor prior to shipping the device 146, or may be updated to improve reliability as desired when used in association with the information handling system 100. According to another aspect, a specific memory location, or range of memory locations, of the memory of the device 146 can include a configuration space register operable to store configuration data associated with the device 146. Configuration space register can include a capabilities list, S-parameters, channel characteristics, references to other storage devices storing configuration data, or any combination thereof.

Figure 2:
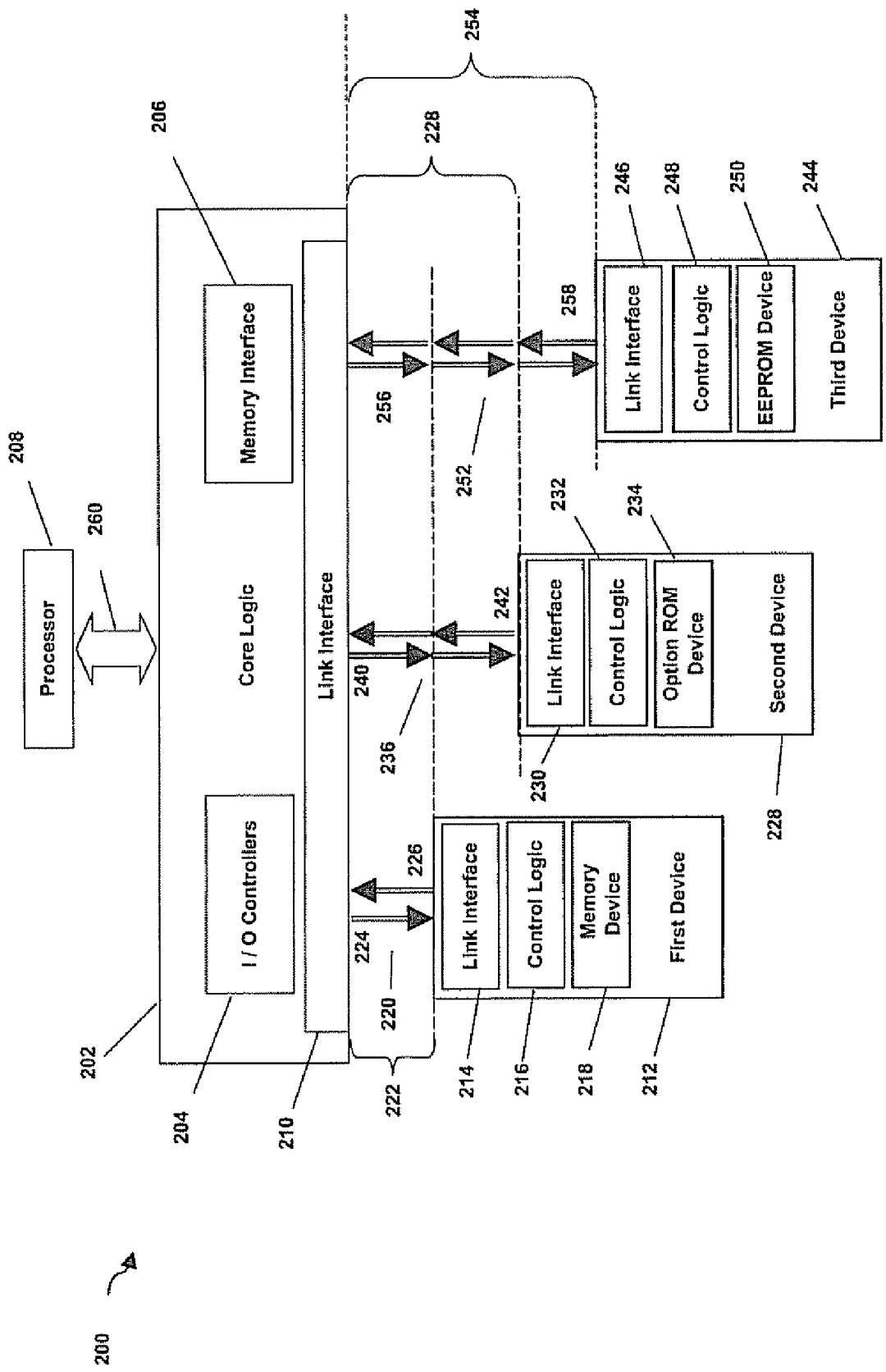
FIG. 2 illustrates a block diagram of communication interconnect system according to another aspect of the disclosure.

FIG. 2 illustrates a communication interconnect system, generally depicted at 200, according to aspect of the disclosure. The communication interconnect system 200 can be employed, in whole or in part, by the information handling system 100 illustrated in FIG. 1 or other types of information handling systems that can benefit from one or more features or functions of the communication interconnect system 200. The communication interconnect system 200 includes a core logic 202 that can be coupled to one or more devices using a communication link. According to one aspect, the link interface 136 as described in FIG. 1 can be provided within the core logic 202.

In one form, the core logic 202 can include one or more I/O controllers 204, a memory interface 206, and a link interface 210. The core logic 202 can be coupled to a processor 208 using a bus 260. The processor 208 and the bus 260 can be provided separate to the core logic 202 however in other embodiments may be provided as a part of the core logic 202. One or more devices can also be coupled to the core logic 202. For example, the core logic 202 can be used to provide access to the information handling system 100 as described in FIG. 1 above. In one form, the link, interface 100 can be used in association with a proprietary bus or an industry standard links or buses. In another embodiment, the core logic 202 can be used during communication between one or more device connected to the core logic 202.

According to one aspect, the communication interconnect system 200 can include a first device 212 including a first link interface 214, a first control logic 216, and a memory device 218. The first device 212 can be coupled to the link interface 210 of the core logic 202 using a first cable 220 including a first cable length 222. The first cable 220 can also include a transmit section 224 operable to communicate signals from the core logic 202 to the first device 212. The first cable 220 can further include a receive section 226 operable to communicate signals from the first device 212 to the core logic 202. According to one aspect, the first transmit section 224 and the first receive section 226 can include one or more signaling devices (e.g., conductors). In one form, the first link interface 214, the first device 212, the first control logic 216, and the memory device 218 or any combination thereof, can be provided as separate components or as a single integrated circuit. During operation, the transmitter section 224 can transmit a request to the first device 212 and the first device 212 can respond to the request using a response signal provided using the respond section 226. As such, the transmitter section 224 and the respond section 226 can be operable as receivers and transmitters as desired.

In one form, the first link 220 can include the first link length 222 used in compliance with an industry standard length for a type of communication link being employed. For example, the first link length 222 can include a length up to approximately twenty (20) inches. The first link 220 can include a first link length 222 of twenty (20) inches in compliance with industry standards to ensure a predictable performance of the first device 212 using the first link 220 having the first link length 222. In this manner, operation of the first link 220 and the first device 212 can comply with an industry standards and an operating mode can be used without having to determine a characteristic associated with the first link 220.

According to another aspect, the first link length 222 can comply with industry standards but may be used at a length that causes reduces signal integrity based on a de-emphasis setting. For example, a channel speed for the first device 212 can be used at a relatively high rate. However, the signal may degrade due to an overall channel length. As such, the device 212 can provide a transmitter and de-emphasis setting level based on the first link length 222 to the core logic 202, and a transmitter and de-emphasis level can be established to ensure signal integrity can be maintained. As such the device 212 can provided a signal strength setting in association with communicating signals.

In one embodiment, the communication interconnect system 200 can include a second device 228 including a second link interface 230, a second control logic 232, and an option ROM memory device 234. The second device 228 can be coupled to the core logic 202 using a second link 236 including a second link length 228 that can be greater than the first link length 222. The second link 236 can include a second transmit section 240 to send signals from the core logic 202 to the second device 228. Additionally, the second link 236 can include one or more signaling devices or circuits.

According to one aspect of the disclosure, the second device 228 can be coupled at a second link length 228 including a link length greater than a standard link length. For example, a standard link length can include a length of up to approximately twenty (20) inches, and the second link length 228 can include at a greater length, such as thirty (30) inches. In one form, the option ROM memory device 234 can include a configuration space that can be read by an information handling system during initialization. The configuration space of the option ROM memory device 234 can include a storage space having a list of capabilities including attributes or specifications. The list can include one or more parameters describing characteristics associated with second link 236. During use, the list of the option ROM memory device 234 can be accessed by the core logic 202, and characteristics of the second link 236 can be used during an initialization sequence to determine an operating mode for the second link 236.

According to another aspect, the option ROM memory device 234 can include an data structure including endpoint parameters that describe channel characteristics known by the third device 228. The BIOS of the information handling system can read the endpoint parameters and compare them to maximum limits for high-speed operation and transmitter and de-emphasis setting. According to one aspect, the option ROM device 234 can include logic or software that can be executed by the information handling system in association with establishing a channel. The core logic 202 and the second device 228 can be set to an operational mode accordingly.

According to another aspect, the communication interconnect system 200 can also include a third device 244 including a third link interface 246, a third control logic 248, and an EEPROM memory device 250. The third device 244 can be coupled to the core logic 202 using a third link 252 provided at a third link length 254 greater than the second link length 228. The third link 252 can also include a third transmit section 256 and a third receive section 258. The third link 252 can include a one or more signaling devices or circuits.

According to one aspect, the third device 244 includes the third link length 254 having a link length greater than a standard link length. For example, a standard link length can include a length of up to approximately twenty (20) inches. As such, the third link 252 can be provided at a greater length, such as thirty (30) or more inches. In one form, the EEPROM device 250 of the third device 244 can include one or more parameters for describing a characteristic, such as the third link length 254, of the third link 256. For example, the EEPROM device 250 can include a capabilities list (not shown) stored within a portion of the EEPROM device 250. The capabilities list can include one or more characteristics of the third link 252 and can be access by the core logic 202 to determine an operating mode for the third link 252.

According to another aspect, the third device 244 can include a separate memory device (not shown) other than the EEPROM device 250. The separate memory device can include attributes that can be loaded from the EEPROM device 250 and accessed when establishing a communication channel using the third link 252. The separate memory device may be modified as desired to include attributes based on a characteristic of the third channel 252. The separate memory device can include a capabilities list that can be loaded at power-up or initialization using the EEPROM device 250.

According to one aspect, the communication interconnect system 200 can include more than three (3) devices connected to the core logic 202 and can be internal or external to an information handling system. For example, in one form, the first device 212 can be connected using a chipset-to-cable connector operable to connect a cable directly to the link interface 210. In another form, a link can be coupled to an external chassis of an information handling system. For example, the third link 252 can include a cable coupled to the link interface 210 and further coupled to an external chassis of the information handling system en route to coupling the third device 244. As such, the third link length 254 can include a length based on multiple link or chassis connections. According to one aspect a printed wiring board (PWB) interconnect can also be employed.

In one form, the core logic 202 can utilize a standard interface connection for a cable link to specify maximum performance operating modes using form factor standards for the device or cable. However, in other forms, the core logic 202 can allow for communicating or interconnecting multiple devices using a variety of channels or links having various link lengths. For example, the first device 212 can be connected at the first link length 222 to the core logic 202.

Additionally, the third device 244 can also be connected to the core logic 202 at the third link length 254. The third device 244 can be coupled using the third link 252 that can include connecting multiple junctions or couplings within the third link 252. For example, the third link 252 can include a riser cable, a back plane, or other type of connection or link. The third device 244 can be coupled at a greater distance than the first link length 222 using connections that may result in signal losses or impedance discontinuities that are unknown to the core logic 202 and an associated information handling system. As such, characteristics of the third link 244 can be accessed prior to using the third link 244 to ensure a communication channel is provided based on the characteristics of the third link 252.

In one form, during an initialization sequence, an information handling system coupled to the link interconnect system 200 can access one or more operating parameters for each device coupled to the link interface 210 to determine an operating mode for a communication channel for each device. For example, the first device 212 can be used to comply with an industry standard. As such, the interconnect system 200 can be used to negotiate an operating speed for the first device 212 based on a predicted operating characteristics of the first device 212 and the first link 220. For example, the memory device 218 of the first device 212 can include configuration data that can be obtained from a standard operating parameter location stored within the memory device 218.

According to one aspect, the interconnect system 200 can detect the second device 228 coupled to the link interface 210. For example, the second device 234 can map a request to access operating parameters from a standard memory location to the option ROM memory device 234 when coupled to the link interface 210. The option ROM memory device 234 can include one or more operating parameters that can be communicated to the core logic 202 and used by the information handling system for establishing a communication channel using the second link 236. For example, an information handling system coupled to the host bus 260 may employ a BIOS initialization sequence that can access the option ROM memory device 234 of the second device 234. Information stored with the option ROM memory device 234 can be used by the BIOS to determine an operating mode for communicating with the second device 228 using the second link 236. In one embodiment, the option ROM memory device 234 can include a channel setting or operating parameters unique to the second link 236. For example, the second link length 228 of the second link 236 may not be operable at a high or maximum communication speed due to loss that may be inherent to the second link 236 and interconnects for connecting the second device 234 to the link interface 210 using the second link 236. As such, the option ROM memory device 234 can provide a desired setting, operating parameters, or attributes to the BIOS and a desired operating mode can be established. In this manner, the core logic 202 can provide information unique to the second device 228 and the second link 236 and an operating mode can be established accordingly. For example, the second device 234 can be operated at a slower speed to accommodate the second link 236 having an increased link length. In this manner, losses for communication signals that may have occurred as a result of increased channel lengths operated at relatively high channel speeds can be obviated, According to another aspect, a transmitter and de-emphasis setting can be used in association with a specific device connected to the core logic 202. For example, one or more devices can be coupled to the link interface 210, and a signal level setting, or transmitter and de-emphasis setting, a channel parameter, can be communicated from each connected device to the core logic 202. A transmitter and de-emphasis setting for each device can be established based on a unique channel characteristic of the specific link connecting the device to the core logic 202. For example, the first device 212 can be coupled using a first transmitter and de-emphasis setting, and the second device 228 can be coupled using a second transmitter and de-emphasis setting. The first device 212 can access the memory device 218 to provide a first transmitter and de-emphasis setting, and the second device 228 can provide a second transmitter and de-emphasis setting using the option ROM memory device 234. The core logic 202 can process the parameters to determine a transmitter and de-emphasis setting for communicating with each device.

Figure 3:
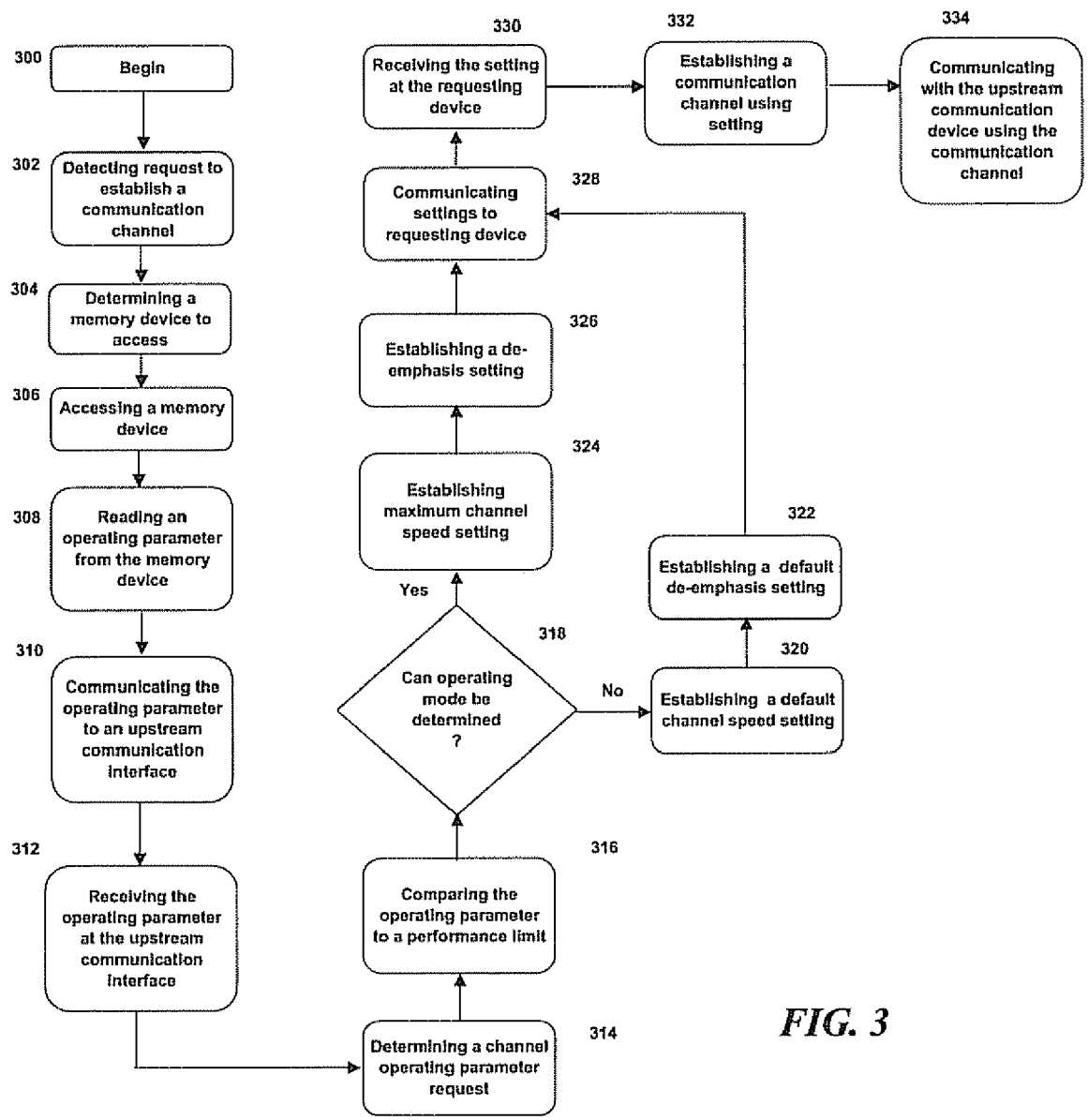
FIG. 3 illustrates a method of determining an operating mode of a communication channel according to a further aspect of the disclosure.

FIG. 3 illustrates a flow diagram for determining an operating mode for a communication channel according to one aspect of the disclosure. The method of FIG. 3 can be employed in whole or in part by the information handling system 100 depicted in FIG. 1, the communication interconnect system 200 illustrated in FIG. 2, or other types of systems, devices, modules, or components that can employ the method of FIG. 3. Additionally, the method can be embodied using various types of encoded logic or computer readable mediums such as software, firmware, hardware, or other forms of encoded logic or computer readable mediums that can provide all or a portion of the method of FIG. 3.

The method begins generally at 300. At block 302, the method proceeds upon detecting a request to establish a communication channel. For example, a device can be connected to a communication interface using a communication medium such as a communication link, communication cable, chassis cable, riser cable, or and combination thereof. In one embodiment, a request may be detected for a device that may already be connected to a communication interface. For example, a new or additional communication channel may be requested.

Upon detecting a request, at block 304 the method proceeds to determine a memory device to access to obtain an operating characteristic to establish the communication channel. For example, one or more operating characteristics for establishing a communication channel can be stored within a specific memory device. In one form, the memory device can store an operating characteristic associated with the device to establish a communication channel.

At block 306, the memory device can be accessed and at block 308, an operating parameter can be read from the memory device. In one embodiment, an operating parameter can be stored within an option ROM memory device. In other forms, the operating parameter can be stored within a capabilities list of a memory device and used in association with establishing a communication channel. For example, a capabilities list can include a list of various device specific operating characteristics or parameters, and in one form, can include information that can be used to establish an operating channel on a link-by-link basis. For example, a capabilities list can include a location or address that can point to another memory location, or memory device, that may include operating parameters, characteristics, and other information. In one form, the capabilities list can include a configuration space having one or more operating parameters, setting recommendations, attributes, or other types of information. For example, the capabilities list can include a channel speed parameter, a transmitter level parameter, a de-emphasis level parameter, a signal level parameter, a channel length parameter, or various other operating parameters that can be used to establish a communication channel. In one form, a recommended setting can be provided based on a channel length.

For example, recommended setting can include a transmitter and de-emphasis setting and a channel speed setting for a specific channel length.

According to one aspect, a capabilities list can be updated based on an operating characteristic of a communication link or cable. For example, a capabilities list can be updated within a memory device of the requesting device prior to use (e.g. during production). In other forms, the capabilities list can be dynamically updated when the requesting device is employed within an operating environment. For example, a separate memory device can be associated with a capabilities list can be mapped to access the separate memory device when a request to access the capabilities list is detected.

According to another aspect, a capabilities list can include a reference to an EEPROM or other memory device that can include information that can be used in association with establishing a communication link. The EEPROM can be periodically updated as desired to ensure performance expectations can be achieved. The information stored by the EEPROM can be read into a memory location and used to establish a communication link.

In another form, an option ROM device of the device to be connected can be used in association with establishing a communication link. For example, the information stored within the option ROM can include operating characteristics, logical code or software, parameters, and other information that can be accessed by an information handling system and used to establish a communication link.

Upon reading an operating parameter from the memory device, the method proceeds to block 310 and the operating parameter can be communicated to the communication interface. For example, a channel speed operating parameter and a transmitter and de-emphasis operating parameter can be communicated to the communication interface. At block 312, the communication interface can receive the operating parameter communicated by the device, and at block 314, an operating parameter request can be determined.

At block 316, the operating parameter can be compared to a performance limit associated with the communication interface and the information handling system. For example, a device can be coupled at a first distance from the communication interface. The device can communicate an operating parameter associated with a channel length of a connecting communication link or cable. The operating parameter can be compared to a performance limit of the communication interface to determine if the communication interface can operate at a specific channel speed.

Upon comparing the operating parameter to a performance limit associated with the communication interface, the method can proceed to decision block 318 and determine if an operating mode can be provided based on the operating parameter and performance limit. If an operating mode cannot be determined, the method proceeds to block 320, and a default channel speed setting can be established. The method can proceed to block 322 and a default transmitter and de-emphasis setting can be established. The method can then proceed to block 328 and the default settings can be communicated to the requesting device.

If at decision block 318, an operating mode can be determined, the method proceeds to block 324 and establishes a maximum channel speed based on the operating parameter. The method then proceeds to block 326 and a transmitter and de-emphasis setting can be established. At block 328, the updated settings can be communicated to the requesting device. At block 330, the requesting device receives the setting information. The method then proceeds to block 332, and a communication channel including an operating mode can be established based on settings. For example, an operating mode that includes a specific channel speed and transmitter and de-emphasis level can be used, and the requesting device and a communication channel can be established based on operating mode. The method then proceeds to block 334, and communication can be established between the communication interface and the requesting device using the communication channel.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A communication interconnect system operably associated with a communication link, the communication interconnect system comprising:
    a control logic operable to alter an operating mode of a communication link using an operating parameter of a communication channel, wherein the operating parameter includes a de-emphasis level operating parameter to alter a signal level of the communication link and a channel speed operating parameter to establish a communication speed of the communication link; and
    link interface operably coupled to the control logic, the link interface operable to communicate the operating parameter in association with determining the operating mode of the communication link, and further operable to establish the communication channel between the communication device and the communication interface based on the channel speed and the de-emphasis level.

2. The communication interconnect system of claim 1, wherein the operating parameter is a function of a channel length of the communication link.

3. The communication interconnect system of claim 1, wherein the operating parameter includes an S-parameter.

4. The communication interconnect system of claim 3, farther comprising a memory device including an option read only memory (ROM) device accessible by a basic input output system (BIOS) associated with the communication interface.

5. The communication interconnect system of claim 3, wherein the memory device includes a programmable memory device operable to establish capabilities in an associated configuration storage space.

6. The communication interconnect system of claim 5, wherein the configuration storage space includes a capability list including an entry providing a channel length operating parameter and an associated a channel speed operating parameter.

7. The communication interconnect system of claim 1, further comprising a communication interface card.

8. The communication interconnect system of claim 1, wherein the communication link includes a serial communication link.

9. A method of determining an operating mode of a communication link, the method comprising:
    providing an operating parameter within a memory device, the operating parameter associated with a channel characteristic of a communication channel;

reading the operating parameter stored within the memory device;

communicating the operating parameter to a communication interface;

comparing the operating parameter to a performance limit of the communication interface;

determining a channel speed based on the operating parameter;

determining a de-emphasis level based on the operating parameter;

establishing an operating mode of the communication link in response to the comparing the operating parameter to the performance limit; and wherein the establishing includes establishing a communication channel between the communication device and the communication interface based on the channel speed and the de-emphasis level.

10. The method of claim 9, further comprising:

accessing the operating parameter within an option read only memory (ROM) using a basic input output system (BIOS) operably associated with the communication interface; and determining the operating mode using the operating parameter.

11. The method of claim 9, further comprising:

accessing a capabilities list including the operating parameter; and determining the operating mode based on the operating parameter accessed within the capabilities list.

12. The method of claim 11, further comprising:

determining an S-Parameter in association with the communication link; and establishing the operating mode using the S-parameter.

13. The method of claim 9, wherein the communicating includes:

communicating the channel speed operating parameter and de-emphasis recommendation parameter; and determining a channel communication speed and de-emphasis level.

14. An information handling system comprising:

a communication interface operable to establish a communication link based on an operating parameter of a communication channel, wherein the operating parameter includes a de-emphasis level operating parameter to alter a signal level of the communication link and a channel speed;

a communication apparatus including a memory device storing the operating parameter, the communication apparatus operable to be coupled to the communication interface using the communication link and operable to establish the communication channel between the communication apparatus and the communication interface based on the channel speed and the de-emphasis level; and a processor operably coupled to the communication interface, the processor operable to determine the operating performance level of the communication channel of the communication link using the operating parameter.

15. The system of claim 14, wherein the operating parameter includes an S-parameter.

16. The system of claim 15, wherein the memory device includes an option read only memory (ROM) device.

17. The system of claim 16, wherein the operating parameter further includes:

the de-emphasis level operating parameter is based on the channel length; and the channel speed setting based on the channel length.

* * * * *